United States Patent
Yamamoto

[11] Patent Number: 6,001,295
[45] Date of Patent: Dec. 14, 1999

[54] MANUFACTURING METHOD OF AN AIR BAG COVER

[75] Inventor: Tadashi Yamamoto, Aichi, Japan

[73] Assignee: Toyoda Gosei Co., Ltd, Aichi, Japan

[21] Appl. No.: 08/942,790

[22] Filed: Oct. 2, 1997

Related U.S. Application Data

[63] Continuation-in-part of application No. 08/623,925, Mar. 28, 1996.

[30] Foreign Application Priority Data

Mar. 31, 1995 [JP] Japan ..................................... 7-076410

[51] Int. Cl.⁶ .................................................... B29C 45/16
[52] U.S. Cl. ........................................ 264/296; 264/328.7
[58] Field of Search ................. 264/296, 328.7, 264/293, 241

[56] References Cited

U.S. PATENT DOCUMENTS

| | | |
|---|---|---|
| 4,980,115 | 12/1990 | Hatakeyama et al. ............... 264/328.7 |
| 5,121,942 | 6/1992 | Warnick et al. ......................... 280/732 |
| 5,149,479 | 9/1992 | Nakajima ................................. 264/296 |
| 5,180,187 | 1/1993 | Muller et al. . |
| 5,316,822 | 5/1994 | Nishijima et al. ...................... 428/138 |
| 5,340,528 | 8/1994 | Machida et al. ..................... 264/328.7 |
| 5,342,086 | 8/1994 | Harris et al. ............................. 280/728 |
| 5,447,327 | 9/1995 | Jarboe et al. ......................... 280/728.3 |
| 5,447,328 | 9/1995 | Iannazzi et al. ..................... 280/728.3 |
| 5,458,842 | 10/1995 | Goto ........................................ 264/296 |
| 5,476,629 | 12/1995 | Yabe et al. ........................... 264/328.7 |

FOREIGN PATENT DOCUMENTS 2-248238  10/1990  Japan .

*Primary Examiner*—Jan H. Silbaugh
*Assistant Examiner*—Mark Eashoo
*Attorney, Agent, or Firm*—Pillsbury Madison & Sutro LLP

[57] ABSTRACT

A method for manufacturing a molded air bag cover that employs a notch forming member that is projected into the mold cavity following the injection of the cover forming material. After cooling the mold is opened and the molded air bag cover is removed.

4 Claims, 7 Drawing Sheets

FIG. I(a)
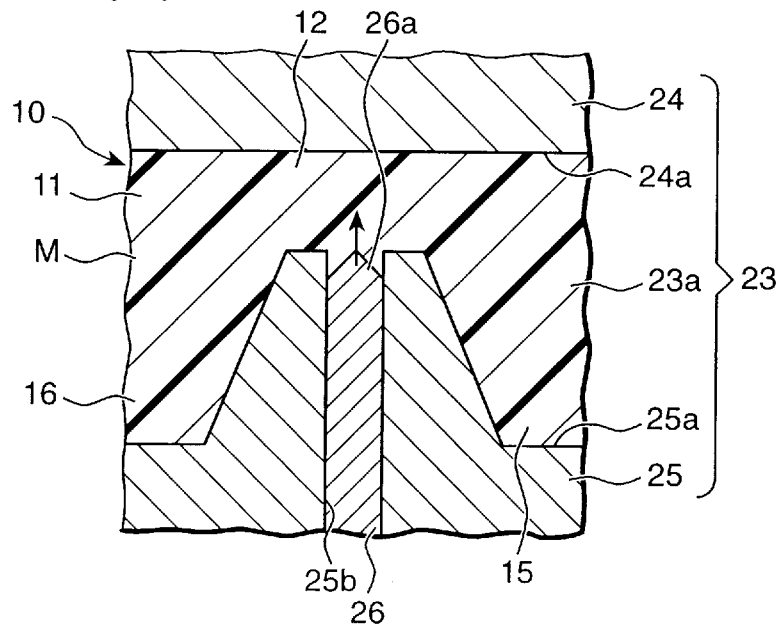
FIG. I(b)
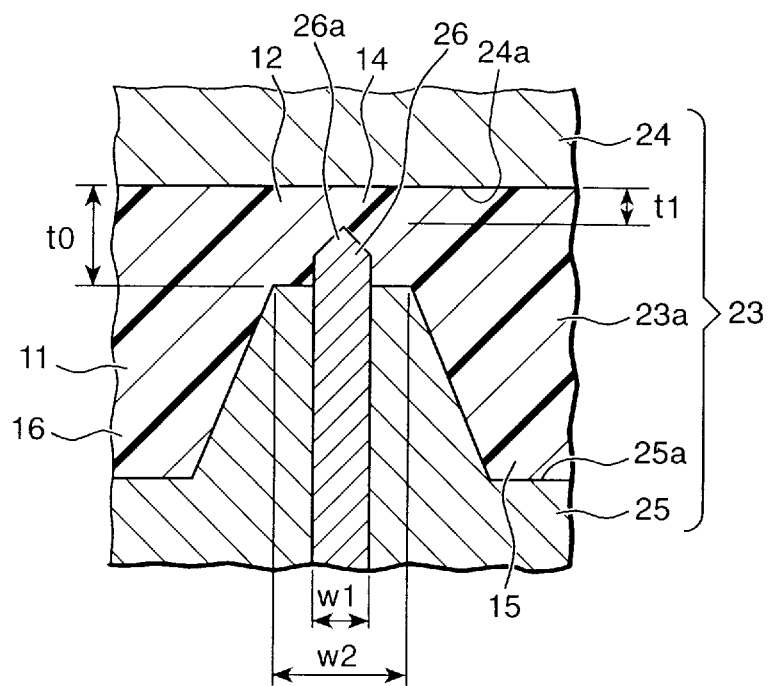

MANUFACTURING METHOD OF AN AIR BAG COVER

This application is a continuation-in-part application of application Ser. No. 08/623,925, filed Mar. 28, 1996, the entire contents of which are incorporated herein by reference.

BACKGROUND OF THE INVENTION

1. Field of the Invention

The present invention relates to a method for manufacturing a pad used with an air bag device. The air bag device may also be installed on a steering wheel, in front of a passenger's seat, or on doors or seats of automobiles. The pad has a thin breakable tear seam portion which is severed upon inflation of the air bag.

2. Description of Related Art and Background

Conventionally, pads of this type are made of synthetic resin formed by injection molding. They have a thin breakable portion (sometimes referred to as a tear line) which breaks or splits open when the air bag inflates so that the air bag protrudes from the pad at the time of inflation. The breakable portion has a thinner notch portion for smooth breaking even if the pad is made of soft and elastic material.

The aforementioned breakable portion provided with the aforementioned notch portion is formed in the following manner, as disclosed in Japanese Patent Publication No. Hei. 2-248238. The pad is formed by injection molding, but initially without the notch portion. After that, the breakable portion is partially melted by heat to form the notch portion therein.

In this case, it is necessary to provide a mold cavity to form the pad with a narrow portion where the gap of the cavity is extremely narrow in order to form the notch portion simultaneously with injection molding of the pad. However, molding failure easily occurs when the narrow portion is provided in the cavity, because molding material cannot flow smoothly at the narrow portion. Therefore, injection molding which can provide the notch portion is very difficult.

However, when forming a notch portion at the breakable portion of the pad using a conventional heat melting method, a welding machine such as a high-frequency welder must be operated while controlling the thickness of the breakable portion. This is a laborious operation, so that the complexity of the process and cost of manufacturing the pad are increased.

SUMMARY OF THE INVENTION

The object of the present invention is to solve the above problems by providing a method for manufacturing a pad which can reduce both the manufacturing steps and manufacturing cost even when the breakable tear seam portion is notched.

It is also an object to reduce tensile strength problems in the tear seam especially in the interior surfaces, by punching through the interior surfaces and through an area of higher tensile strength to expose a larger tensile strength inner core at the notch locations.

It has been recently found that as the thermoplastic molding material begins and undergoes hardening, following injection, the exterior surfaces, those surfaces that will become the interior and exterior surfaces of the pad or airbag cover, have a different set of properties than the interior. This can create a different tensile strength at the surface, than exists at areas internal to the pad's thickness or between the interior and exterior surfaces. Such tensile strength differences can cause tear seam difficulties.

A manufacturing method of a pad according to the present invention comprises the steps of: preparing a mold and a notch forming member; injecting a molding material into the mold; inserting the notch forming member into the mold; punching through portions of a relatively higher tensile strength surface to allow a relatively lower tensile strength inner core to be exposed at the formed notches; cooling the mold to harden the molding material; and releasing the hardened molding material from the mold to obtain the finished pad.

BRIEF DESCRIPTION OF THE DRAWINGS

FIGS. 1(a) and (b) are sectional views of an embodiment of the present invention, taken along the line I—I in FIG. 3;

FIG. 5(a) is a fifty-magnified sectional view of the pad. FIG. 5(b) is a five hundred-magnified sectional view which shows an upper portion of FIG. 5(a). FIG. 5(c) is a five thousand-magnified sectional view which shows a portion in FIG. 5(b). FIG. 5(d) is a ten thousand-magnified sectional view which shows an upper portion of FIG. 5(c).

DETAILED DESCRIPTION OF THE PREFERRED EMBODIMENTS

An embodiment of the present invention will be described with reference to the attached drawings.

Figure 2:
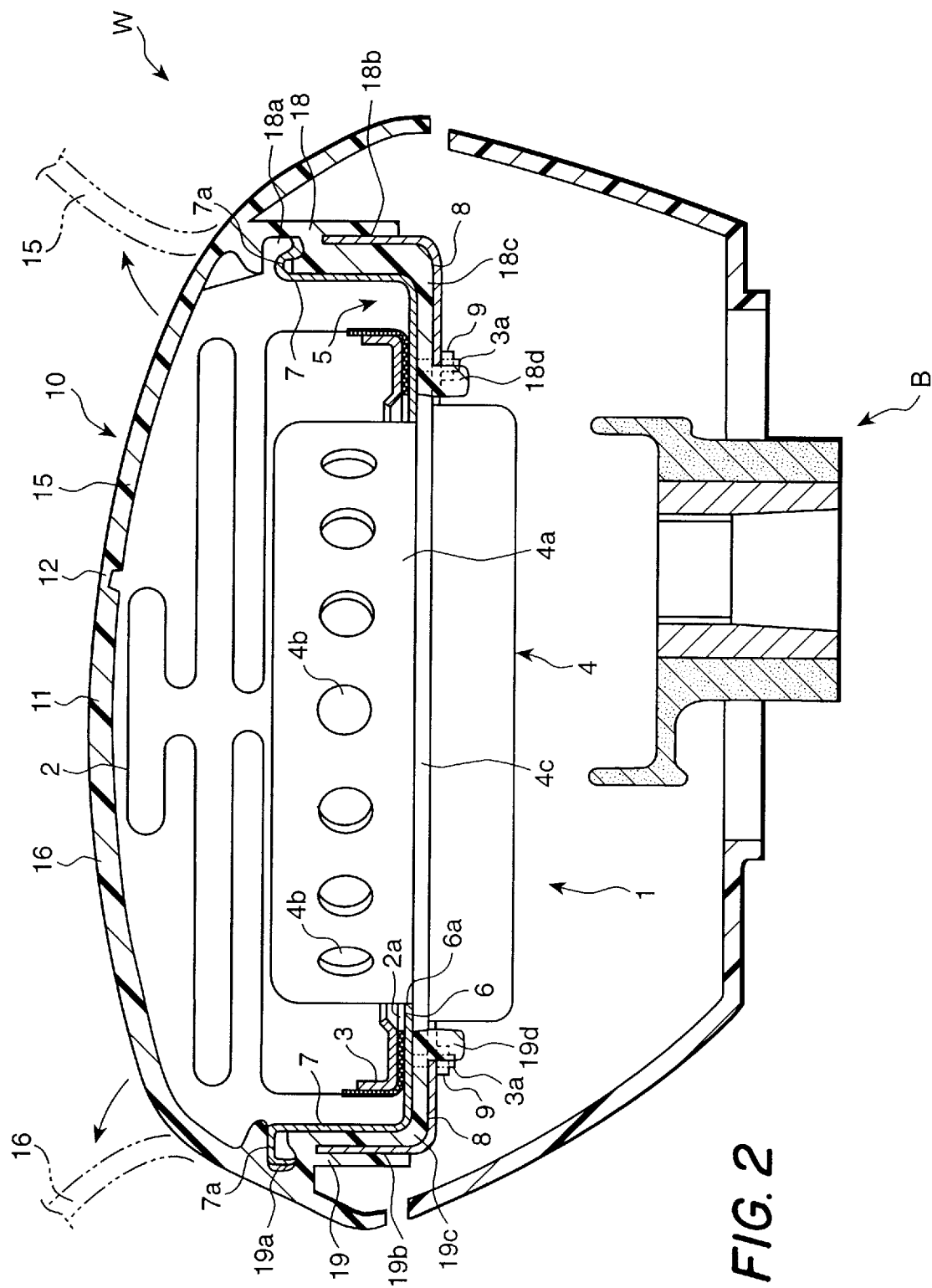
FIG. 2 is a sectional view of a pad manufactured by the embodiment of the present invention.

A pad 10 is used as a cover for an air bag device 1. The air bag device 1 is installed, for example, on the upper portion of the boss portion B of a steering wheel W, as shown in FIG. 2.

The air bag device 1 generally includes a folded air bag 2, an inflator 4 for supplying the air bag 2 with gas for inflation, the pad 10 for covering the folded air bag 2, and a bag holder 5 holding the air bag 2, the inflator 4, and the pad 10.

The air bag 2 has an opening 2a at the lower portion thereof. The inflator 4 comprises, for example, a substantially cylindrical body 4a having gas ejecting holes 4b provided in the upper part thereof, and a flange portion 4c which is formed around the body 4a.

The bag holder 5 is made of a metal plate and comprises a rectangular bottom wall 6 having an inserting hole 6a in the middle thereof, and four side-walls 7 extending upward from the periphery of the bottom wall 6. A hook 7a for retaining respective side-wall parts 18, 19, 20, and 21 of the pad 10 is formed at the upper end of each side-wall 7.

The air bag 2 and inflator 4 are fixed to the bag holder 5 in such a manner that an annular retainer 3 is inserted through the opening 2a into the air bag 2 and disposed within the air bag 2. A plurality of bolts 3a extending downwardly from the retainer 3 are inserted through a peripheral portion of the air bag 2 about opening 2a, the peripheral edge of the inserting wall 6a of the bag holder 6, the flange portion 4c of the inflator, and bracket 8 and are retained there with corresponding nuts 9.

The bracket 8 is made from sheet metal, for example, and is inserted into inserting grooves 18b and 19b formed at the lower surface of the side-wall part 18 and 19, thereby pinching and holding the pad 10 in cooperation with the hook 7a of the side-wall 7.

The pad 10 is made from, for example, thermoplastic elastomer such as polyolefin, styrene, or the like, or soft synthetic resin such as soft vinyl chloride or the like, and is preferably formed by injection molding.

Preferably, the thermoplastic elastomer contains the following components. The hard segment is polypropylene, and the soft segment is EPR (ethylene-α-olefin rubber), and/or styrene block copolymers such as SEBS, SBS, SIS, SEP. The mixture ratio of hard segment:soft segment is about 6:4 to 3:7. The soft segment may be referred to as "olefin thermoplastic elastomer" where EPR is the main component, or "styrene thermoplastic elastomer" where styrene is the main component. Regarding forming temperature, the resin temperature is preferably between 200–270° C., and the die temperature is preferably between 0–50° C.

Figure 3:
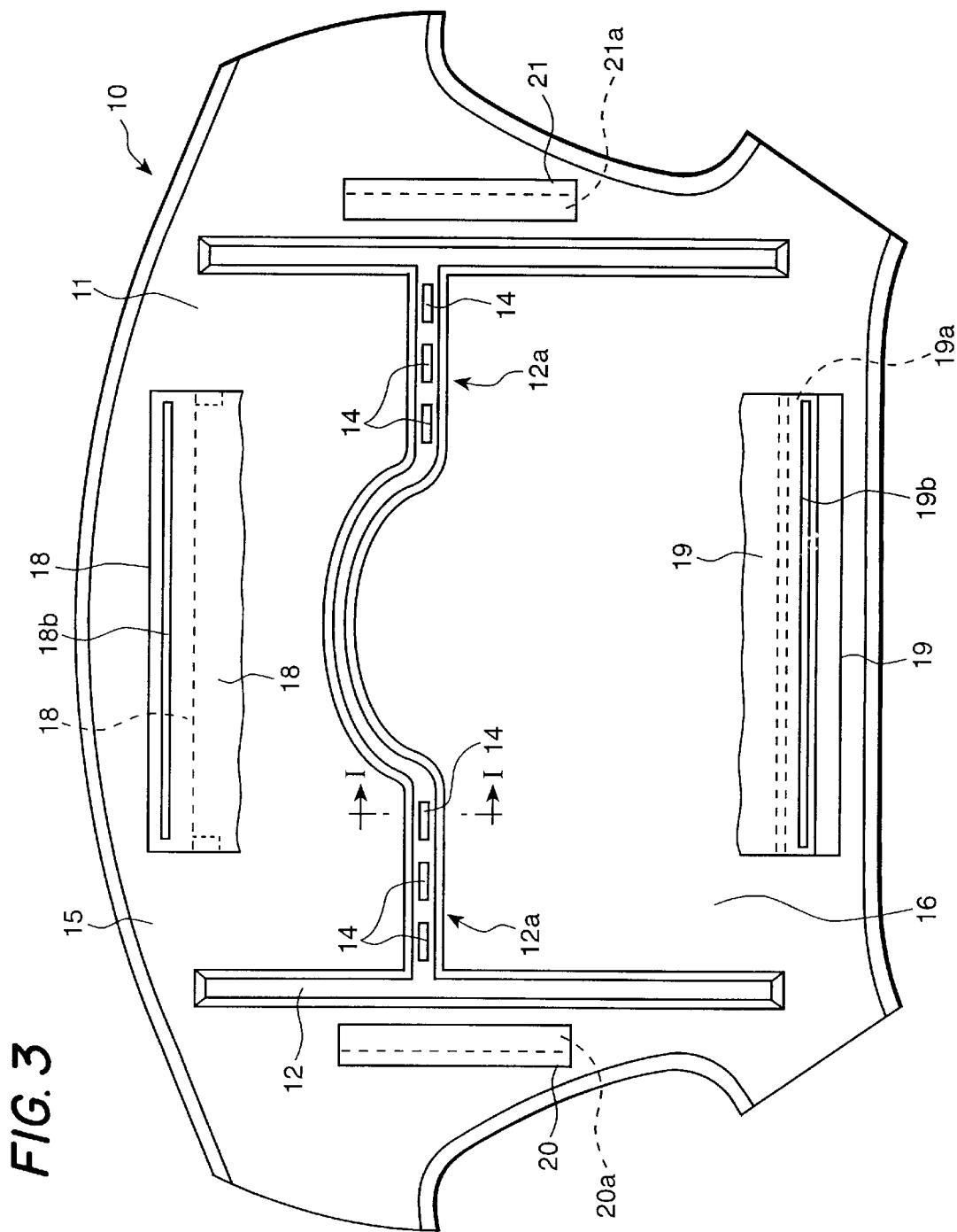
FIG. 3 is a bottom view of the pad manufactured by the embodiment of the present invention.
Figure 4:
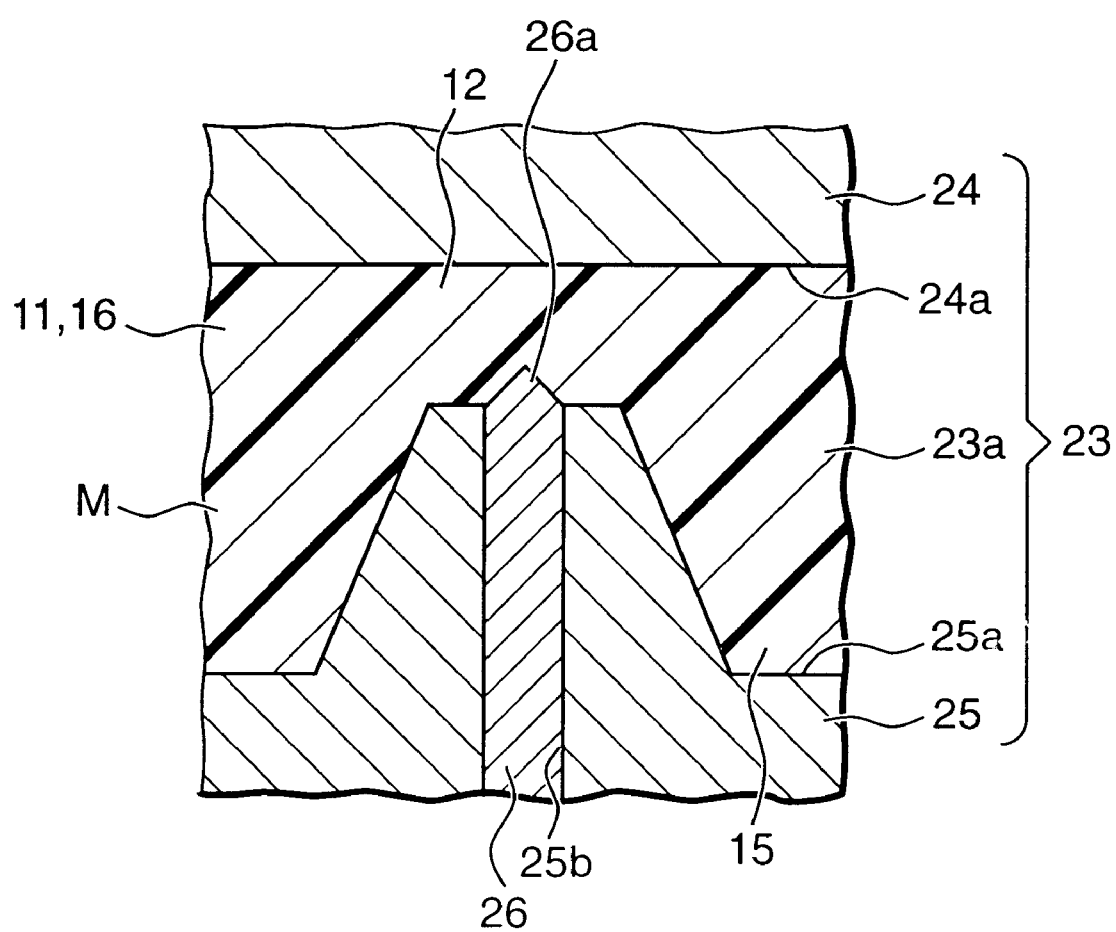
FIG. 4 is a sectional view of another embodiment.

The pad 10 includes an upper wall part 11 and the four side-wall parts 18, 19, 20, and 21, shown in FIG. 3 as protruding from the back surface of the upper wall part 11 in the form of the substantially quadrilateral cylinder.

The upper wall part 11 is provided with a groove-like breakable portion or tear seam or line 12 having, for example, a substantially H-shaped form as viewed from underneath. In general, the breakable tear seam portion 12 is configured in such a manner that it allows flap portions 15, 16, having the transverse rod portion of the H-shape of the breakable portion 12 therebetween, to be opened like French doors upon inflation of the air bag 2, as seen in phantom in FIG. 2. The breakable portion 12 includes, for example, two straight portions 12a in the transverse portion of the H-shape, adjacent to the vertical portions of the H-shape. The straight portions 12a are provided with a plurality of spaced apart notch portions 14 there along which are thinner than an overall thickness of other areas of the breakable tear seam portion 12. Pads, and their tear seams, when molded from thermoplastic resin can be difficult to open along such tear seams where such resin has high tensile strength. Simply thinning the thickness along the tear seam can effect the flow and formation of the pad/tear seam. Another problem is that the circumferential portion of the door portion of the pad is pressed and expanded by the inflated airbag if the tear seam is generally thinned.

By providing the notch portions 14, along the transverse section of the H-shaped tear seam, for example, the notch portions 14 are broken initially when the airbag is inflated. Thereafter, the remaining portions of the tear seam 12, not provided with botch portions 14, will sequentially be broken more easily. The force to overcome the tensile strength and necessary to break the remaining groove is less than the force needed to break a tear seam having ordinary tensile strength because the remaining groove is broken sequentially after the notch portion 14 is broken. Therefore, the pad is broken with little force.

In order to prevent sinks or the like of the breakable portion 12 and the notch portions 14 from occurring on the outer peripheral surface of the upper wall part 11, the thickness t1 of the notch portion 14 is between about 0.6 and 1.2 mm and the thickness to the breakable portion 12 other than at the notch portions 14 is between about 0.8 mm and 2.5 mm. In the present embodiment, t1 is 0.8 mm and t0 is 1.5 mm (see FIG. 1(b)).

Similarly, the width dimension w1 of the notch portions 14 is between about 0.5 and 1.5 mm and the width dimension w2 of the breakable portion 12 is between about 1.0 and 3.0 mm. In the present embodiment, w1 is 0.7 mm and w2 is 2.0 mm.

Retaining grooves 18a, 19a are respectively formed on the inner peripheral surface of the front and rear side-wall parts 18, 19 of the pad 10. The hooks 7a of the side-wall 7 of the bag holder 5 are retained in respective retaining grooves 18a, 19a. Further, insertion grooves 18b, 19b, into which the associated portions of bracket 8 are inserted, are formed at the lower surfaces of the front and rear side-wall parts 18, 19 (see FIG. 2).

In the present embodiment, extended parts 18c, 19c of the pad 10 extend inwardly at the lower surface of the side-wall parts 18, 19 and have protrusions 18d, 19d at the end thereof. The protrusions 18d, 19d are retained by the bracket 8 fixed to the bottom wall 6 by the bolts 3a and the nuts 9, so that the extended parts 18c, 19c serve to strongly secure the side-wall parts 18, 19 to the bag holder 5. The side-wall parts 18 and 19 experience large pulling forces when the breakable portion 12 of the pad 10 severs during air bag inflation.

The right and left side-wall parts 20, 21 have securing grooves 20a, 21a capable of receiving the associated hook portions 7a of the side-wall 7 at the inner circumferential surface thereof (see FIG. 3).

As shown in FIG. 1(a), a mold 23 to be used for molding the above pad 10 comprises divided mold portions 24, 25 provided with shaped mold surfaces 24a, 25a. Mold portion 25, which molds the lower side of the pad 10, has a plurality of engagement holes 25b at the specific locations at which the notch portions 14 of the breakable portion 12 are formed. A notch forming member 26 is slidably disposed in each engagement hole 25b.

Mold portion 25 also has a slide core (not shown) which is capable of molding the extended parts 18c, 19c of the side-wall parts 18, 19. Upon molding, the extended parts 18c, 19c are formed not bent inward, but extended downward. Accordingly, the extended parts 18c, 19c are bent inward when the air bag device is later assembled.

Figure 5A:
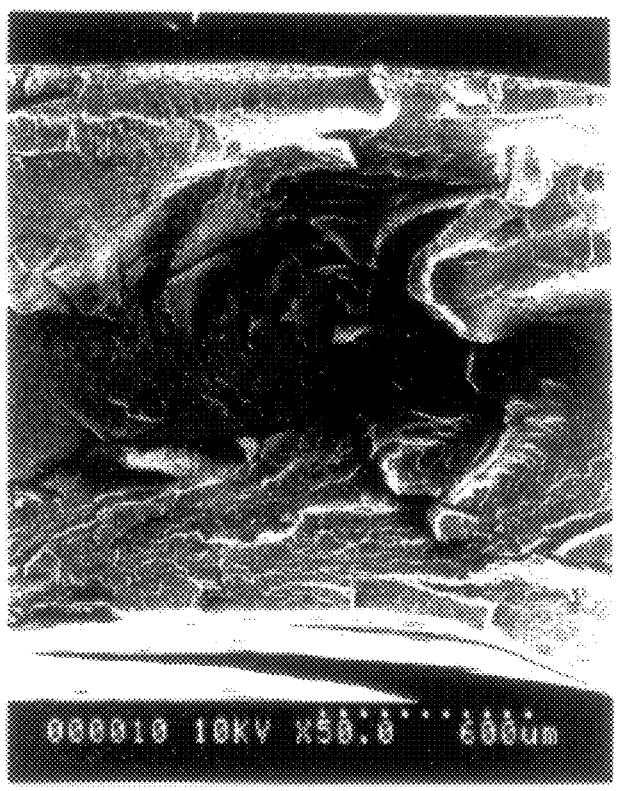
FIG. 5(a)–(d) shows photographic sectional views of the pad which is formed by injection molding.
Figure 5B:
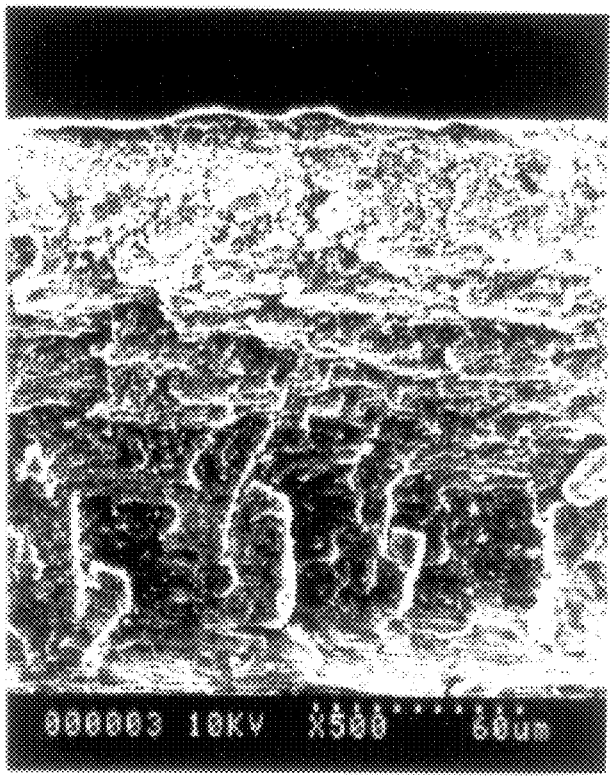
Figure 5C:
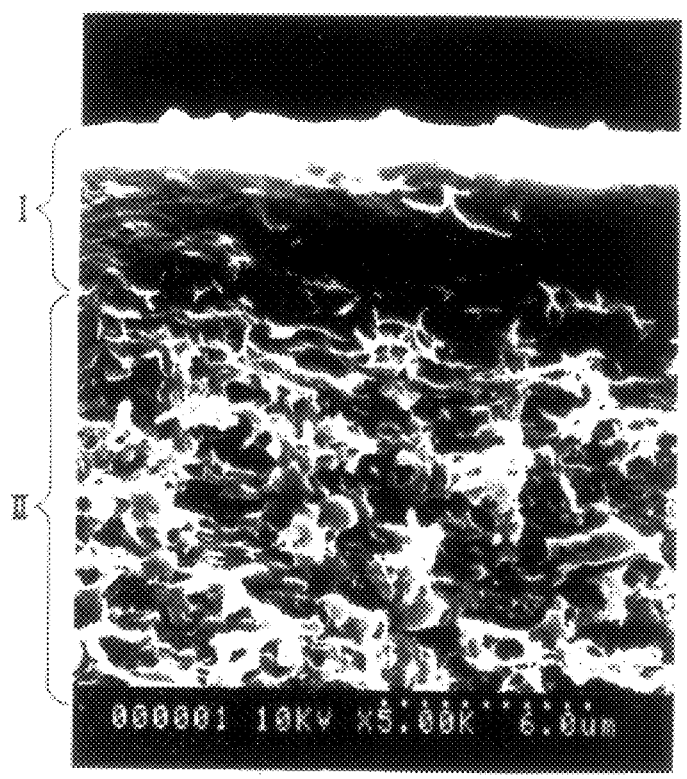
Figure 5D:
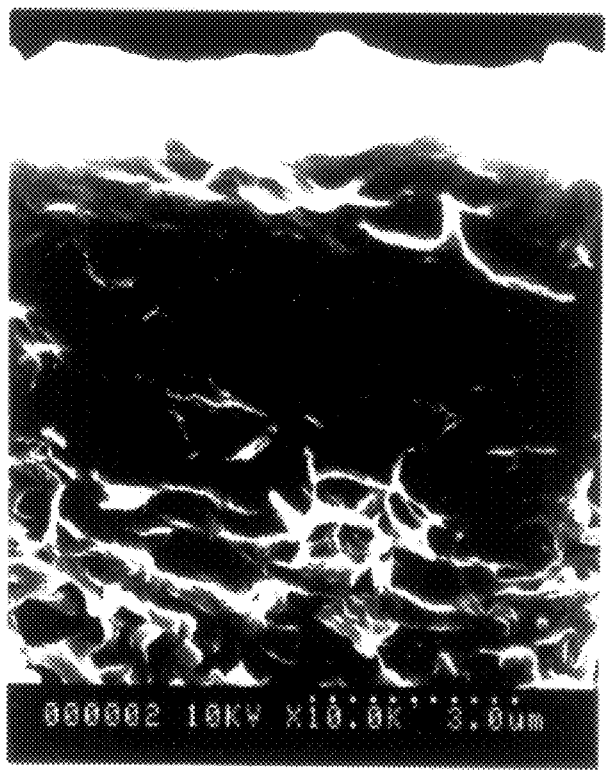

Reference can be made to FIGS. 5(a)–(d) which are photographic cross-sectional views of a pad formed by injection molding. FIG. 5(a) is a fifty times magnified sectional view of the pad. FIG. 5(b) is a five hundred times magnified sectional view which shows an upper portion of FIG. 5(a). FIG. 5(c) is a five thousand times magnified sectional view which shows the circled "A" portion in FIG. 5(b). FIG. 5(d) is a ten thousand times magnified sectional view which shows an upper portion of FIG. 5(c). These photographs were obtained after the rubber component in the pad was extracted by chloroform. As shown in FIG. 5(c), very little of the rubber component is extracted by chloroform in the upper portion I, while a much greater quantity of the rubber component is extracted by chloroform from the lower part on II making that lower portion porous. It is understood from this phenomenon that before the extraction of rubber by chloroform, the upper portion I is almost completely occupied by polypropylene and there is almost no rubber component, and that a much greater quantity of the rubber component existed in the lower portion II.

The following table 1 compares breaking characteristics of a pad provided with a notch portion with a pad thickness not provided with a notch portion as viewed at room temperature. Hereupon, the pad A is provided with a notch portion and the pad B is not provided with a notch portion. The thickness of the notch portion is 10 mm.

TABLE 1

|       | tensile strength(kgf) | extension (mm) |
|-------|-----------------------|----------------|
| Pad A | 9.6                   | 6.7            |
| Pad B | 12.4                  | 11.8           |

Figure 7:
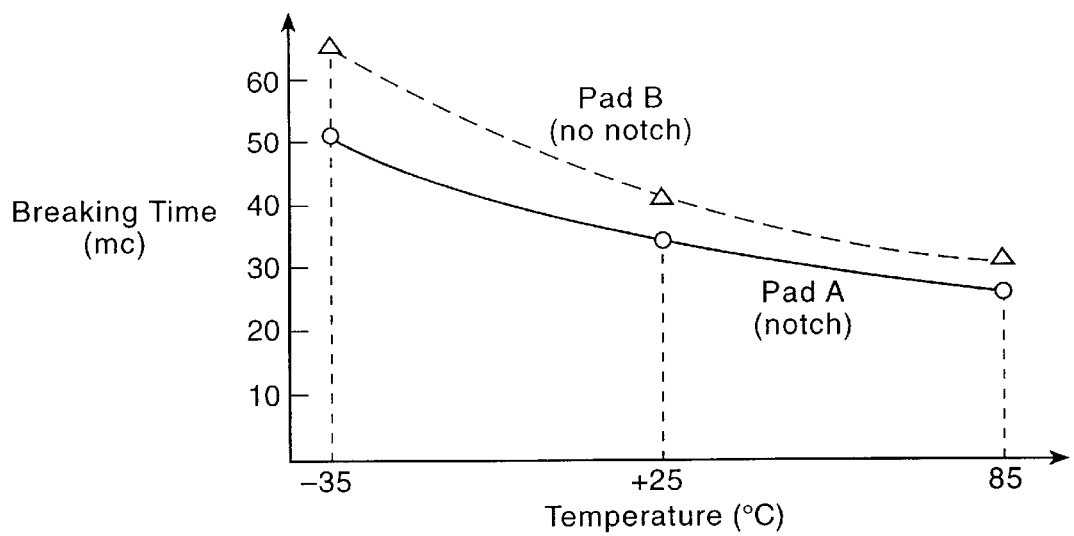
FIG. 7 shows a relationship of the temperature and the breaking time of various pads.

The graph at FIG. 7 shows a relationship of the temperature and the breaking time of the pads A and B. The breaking time means the time from the inflation signal to the start of the breaking.

From the above results, it can be understood that the pad A develops smoothly and rapidly when the notch portion is provided.

Now the molding method using the above mold 23 is explained. Molding material M, for forming the pad 10 is injected into a closed mold cavity 23a after the mold portions 24, 25 are fastened together. At this time, as shown in FIG. 1(a), the notch forming member 26 is retracted and on stand-by so as not to protrude from the mold surface 25a of the mold portion 25.

After the molding material M is completely injected, the notch forming member 26 is raised up, as shown in FIG. 1(b).

Figure 6A:
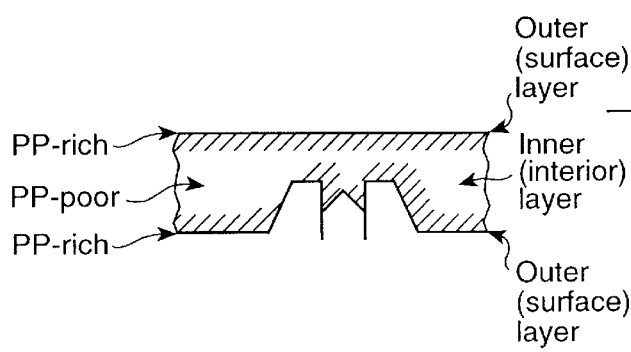
FIGS. 6(a) and (b) show the outer surface layer cut by the notch forming member having v-shaped sectional views.
Figure 6B:
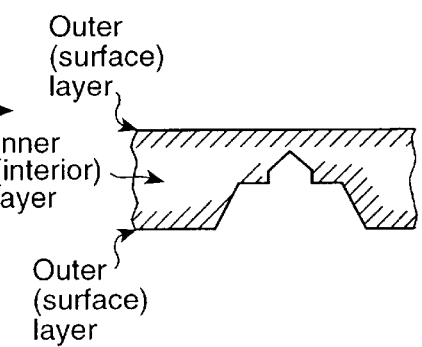

When the polyolefin or styrene thermoplastic elastomer is injection-molded, the outer surfaces in conjunction with the mold includes more PP (polypropylene) than the inner layer within the molded product. The tensile strength of the PP (polypropylene)-rich layer is larger than that of the PP-poor layer. That is, the tensile strength in each of the outer surfaces is larger than that of the inner interior layer or inner core. In the present invention, the outer surface that will be the pad's interior surface is cut by the notch forming member having v-shaped sectional view, so that the tip 26a penetrates into the inner area of the pad's tear seam thickness as shown in FIG. 6(b), and the tensile strength is effectively reduced. FIG. 6(a) shows the PP-rich outer surface and the relatively PP-poor inner area. In FIG. 6(a) injection of the molding resin is complete, the higher tensile strength PP-rich outer surfaces and developing and the notch forming member 26 remains in its lowered unextended position.

It should be noted that the PP-rich layer forms naturally after the molding material is injected but prior to hardening. Thus, it is important that the notch forming member 26 be extended or raised to its extended position at the appropriate point in the process. If the notch forming member 26 is raised to its extended prior to injection of the molding material, or too early in the process, the PP-rich layer is simply formed over or about the notch forming member 26 as it would with respect to any interior mold surface.

As shown in FIG. 6(a), the PP-rich surface has formed over the area about the top of 20a. If the notch forming member is projected in advance before injection, PP-rich layer 16 is formed on the notch forming member. So it is necessary to raise the notch forming member 26 after injection is completed so as to cut through the already formed PP-rich layer.

Consequently, the molding material M is thereafter hardened by cooling the mold portions 24, 25. The finished pad 10 is obtained by opening the mold and removing the hardened molding material M from the mold.

The pad 10 manufactured according to the above process is assembled into the air bag device 1 in the following manner. Each hook 7a of the side-wall 7 of the bag holder 5 is engaged in respective securing grooves 18a, 19a, 20a, 21a of the side-wall parts 18, 19, 20, 21. The brackets 8, 8 are inserted into the inserting grooves 18b, 19b while the extended parts 18c, 19c are bent inward. Finally, the brackets 8, 8 are fixed to the bag holder 5 to assemble the pad into the air bag device 1. It is noted that the folded air bag 2 and the inflator 4 are previously assembled into the bag holder 5 by utilizing the retainer 3, before the pad 10 is attached.

The air bag device 1 constructed as described is assembled into the steering wheel W and the steering wheel W is installed on the automobile. When the air bag 2 is inflated by the gas from the inflator 4, the breakable portion 12 breaks or splits open, starting with the notch portion 14. At this time, the flap portions 15, 16 open and the air bag 2 protrudes from the pad 10 and is inflated to its full extent.

In the manufacturing method of the pad 10 of this embodiment, the cavity 23a of the mold does not have a narrow portion where the gap of the cavity is extremely narrow in order to form the notch portion 14. Therefore, the molding material M flows smoothly, so that molding failures do not occur.

Further, the slidable notch forming member 26 is previously inserted into the molding portion of the breakable portion 12 before the molding material hardens. Accordingly, the notch forming member 26 can be extended into the molding portion of the breakable portion 12 smoothly. The notch portion 14 having a predetermined thickness can be formed easily after the inserted portion hardens.

Accordingly, the manufacturing method of this embodiment can produce the pad 10 having the breakable portion 12 provided with the notch portion 14 while the molding material hardens. The manufacturing steps and manufacturing cost can be reduced since processing after injection molding can be omitted.

In the manufacturing method as described above, the notch forming member 26 is initially retracted so as not to protrude from the mold surface 25a. However, the air existing between a tip 26a of the notch forming member 26 and the inner circumferential surface of the engagement hole 25b may become involved in the molding material M. In order to solve this problem, the notch forming member 26 can be protruded from the mold surface 25a in such a manner that the gap between the circumferential surface of the tip 26a and the inner circumferential surface of the engagement hole 25b is eliminated. Therefore, the molding material M can smoothly flow. The tip 26a is therefore not worn away.

Further, the notch portion 14 of the breakable portion 12 is formed intermittently in the above embodiment. But the notch portion may be also formed continuously.

The location of the notch portion 14 is not limited to that shown in this embodiment since the notch portion is only the point where the pad begins to split or break.

What is claimed is:

1. A method for manufacturing a molded pad having at least one groove portion formed therein, comprising the steps of:

injecting a thermoplastic molding material, comprising polypropylene into a molding cavity of a mold;

allowing a polypropylene-rich outer surface to develop about a polypropylene-poor inner area;

projecting at least one notch forming member through the polypropylene-rich surface and into the polypropylene-poor inner area;

cooling said mold to thereby harden the thermoplastic molding material thereby forming a molded pad; and removing the hardened thermoplastic molding material from the molding cavity, thereby obtaining the molded pad having a notch portion formed therein in which the polypropylene-poor inner area is exposed.

2. The method according to claim 1, wherein projecting is performed after injecting, while said thermoplastic molding material is soft.

3. The method according to claim 1, wherein projecting comprises projecting a plurality of notch forming members into said molding cavity.

4. The method according to claim 1, wherein the at least one notch forming member is slidably disposed in the mold, and the projecting comprises slidably extending the at least one notch forming member until an end portion thereof projects into the polypropylene-poor inner area.

* * * * *